US008022651B2

(12) United States Patent
Kifuku

(10) Patent No.: US 8,022,651 B2
(45) Date of Patent: Sep. 20, 2011

(54) ELECTRIC POWER STEERING DEVICE

(75) Inventor: Takayuki Kifuku, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 365 days.

(21) Appl. No.: 12/171,686

(22) Filed: Jul. 11, 2008

(65) Prior Publication Data

US 2009/0250289 A1    Oct. 8, 2009

(30) Foreign Application Priority Data

Apr. 7, 2008   (JP) ................................ 2008-099337

(51) Int. Cl.
*H02K 17/32*   (2006.01)

(52) U.S. Cl. ......................... 318/434; 318/599; 318/650

(58) Field of Classification Search .................. 318/434, 318/599, 650
See application file for complete search history.

(56) References Cited

U.S. PATENT DOCUMENTS

| | | | |
|---|---|---|---|
| 5,631,529 A * | 5/1997 | Shimizu et al. ............... | 318/432 |
| 6,459,971 B1 * | 10/2002 | Kurishige et al. .............. | 701/41 |
| 6,779,626 B2 * | 8/2004 | Matsuoka et al. ............ | 180/446 |
| 6,795,762 B2 * | 9/2004 | Itoh et al. ....................... | 701/43 |
| 6,838,846 B2 * | 1/2005 | Matsuoka ...................... | 318/432 |
| 6,906,492 B2 * | 6/2005 | Matsushita .................... | 318/727 |
| 7,463,464 B2 * | 12/2008 | Quirion et al. ................. | 361/31 |

FOREIGN PATENT DOCUMENTS

| | | |
|---|---|---|
| JP | 63-180567 B2 | 7/1988 |
| JP | 04-31171 A | 2/1992 |
| JP | 11-263240 A | 9/1999 |
| JP | 2007-300749 A | 11/2007 |

OTHER PUBLICATIONS

Japanese Office Action corresponding to Japanese Patent Application No. 12/171,686, dated Apr. 27, 2010.

* cited by examiner

*Primary Examiner* — Bentsu Ro
*Assistant Examiner* — David Luo
(74) *Attorney, Agent, or Firm* — Sughrue Mion, PLLC

(57) ABSTRACT

Provided are an electric power steering device which is capable of determining a failure without using a motor current, and an electric power steering device which removes any motor current detecting unit for detecting the motor current such as a shunt resistor, and suppresses the heat generation and the power loss in the device, thereby making it possible to realize the downsized device, a reduction in the costs, and the higher efficiency. An electric power steering device according to the present invention includes: a motor coupled with a steering system; a drive control unit for controlling a drive of the motor; a motor impression voltage detecting unit for detecting an applied voltage of the motor; and an abnormality determining unit for determining abnormality based on a comparison result of the detected motor impression voltage and an output voltage of the drive control unit.

8 Claims, 6 Drawing Sheets

ELECTRIC POWER STEERING DEVICE

BACKGROUND OF THE INVENTION

1. Field of the Invention

The present invention relates to an electric power steering device that generates a steering assist torque with a motor.

2. Description of the Related Art

Up to now, there has been proposed a control method in which a torque sensor that detects a steering torque of a steering system and a vehicle speed sensor that detects a vehicle speed are disposed, and the assist torque of a motor is controlled based on the outputs of those sensors, and the inertia and viscosity of a steering system are compensated based on the angular velocity and the angular acceleration of the motor in addition to the above outputs in order to improve the steering feeling in an electric power steering device.

In the conventional electric power steering device, as described above, a target current is determined according to a target motor torque which is determined based on the steering torque, and the angular velocity and angular acceleration of the motor, and a current feedback control is conducted so that a detection current that is detected by a shunt resistor that is inserted in a current path of the motor coincides with the target current.

In the conventional electric power steering device, since the current feedback control is implemented as described above, the target current and the detection current coincide with each other when the device is normal. Therefore, it is determined that the device is abnormal when a difference between the target current and the detection current becomes equal to or higher than a given value.

In the conventional electric power steering device described in JP 06-29031 B, there is provided a shunt resistor for detecting the current. A current flows in the shunt resistor to generate a heat in the shunt resistor.

In recent years, the types of vehicles in which the electric power steering device is installed are expanded to a standard sized car that is large in weight, and a current of the motor is increasingly made larger, and a problem on the heat generation due to the shunt resistor becomes remarkable. Also, a voltage drop due to the shunt resistor can be put into a power loss due to the shunt resistor, and with a larger current in recent years, the power loss due to the shunt resistor also increases, resulting in such a problem that the higher efficiency of the device is impeded.

Also, in order to radiate the heat caused by the shunt resistor, it is necessary to provide a controller with a large-sized heat sink. Also, in order to detect the current, there is required a peripheral circuit for loading a voltage between both ends of the shunt resistor into a microcomputer as well as the shunt resistor. For that reason, not only the controller gets complicated, but also a space for mounting those parts on a circuit board is required, resulting in such a problem that the controller becomes large, and the costs are increased.

SUMMARY OF THE INVENTION

The present invention has been made to solve the above problems, and therefore has an object to provide an electric power steering device which is capable of determining a failure without using a motor current, thereby providing fail safe means that is suitable for an electric power steering device with no motor current detecting means.

Another object of the present invention is to provide an electric power steering device which eliminates motor current detecting means for detecting the motor current such as a shunt resistor, and suppresses the heat generation and the power loss in the device, thereby making it possible to realize the downsized device, a reduction in costs, and the higher efficiency.

According to the present invention, there is provided an electric power steering device, including: a motor coupled with a steering system; drive control means for controlling a drive of the motor; motor impression voltage detecting means for detecting an applied voltage of the motor; and abnormality determining means for determining abnormality based on a comparison result of the detected motor impression voltage and an output voltage of the drive control means.

According to the present invention, there is provided a fail safe means that is suitable for the electric power steering device with no motor current detecting means for detecting the motor current such as the shunt resistor.

DETAILED DESCRIPTION OF THE PREFERRED EMBODIMENTS

First Embodiment

Figure 1:
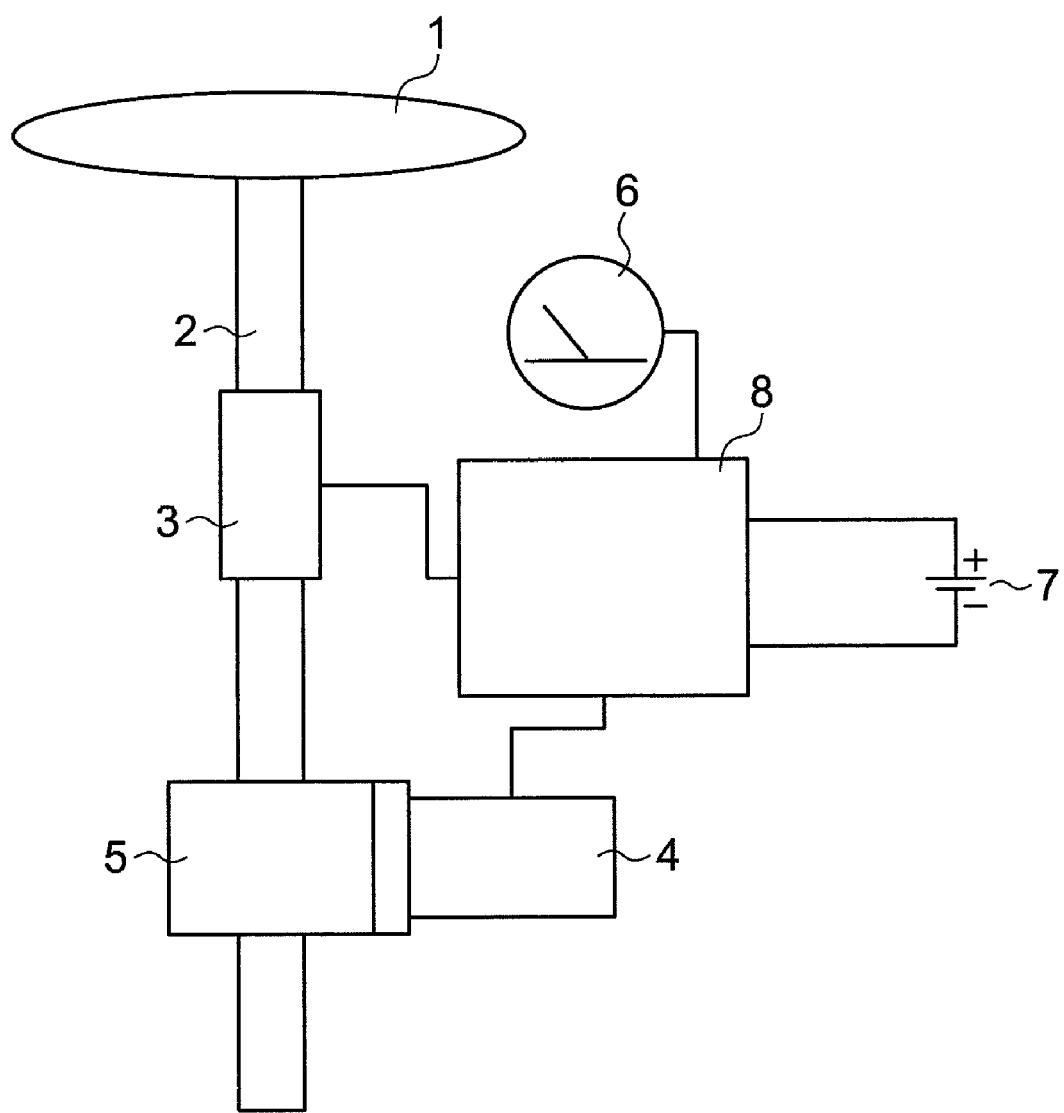
FIG. 1 is a diagram showing the configuration of an electric power steering device according to a first embodiment of the present invention.

A description is given of an electric power steering device according to a first embodiment of the present invention with reference to the accompanying drawings. Referring to FIG. 1, reference numeral 1 denotes a steering wheel, reference numeral 2 denotes a steering shaft, reference numeral 3 denotes a torque sensor that detects the steering force of a driver, and reference numeral 4 denotes a motor that assists the steering force of the driver. In FIG. 1, reference numeral 5 denotes a speed reducer for transmitting the output torque of the motor to the steering shaft 2, reference numeral 6 denotes a vehicle speed sensor that detects the travel velocity of a vehicle, reference numeral 7 denotes a power supply (battery) that is mounted in the vehicle, and reference numeral 8 denotes a controller that drives the motor 4 based on the output signals of the torque sensor 3 and the vehicle speed sensor 6.

Figure 2:
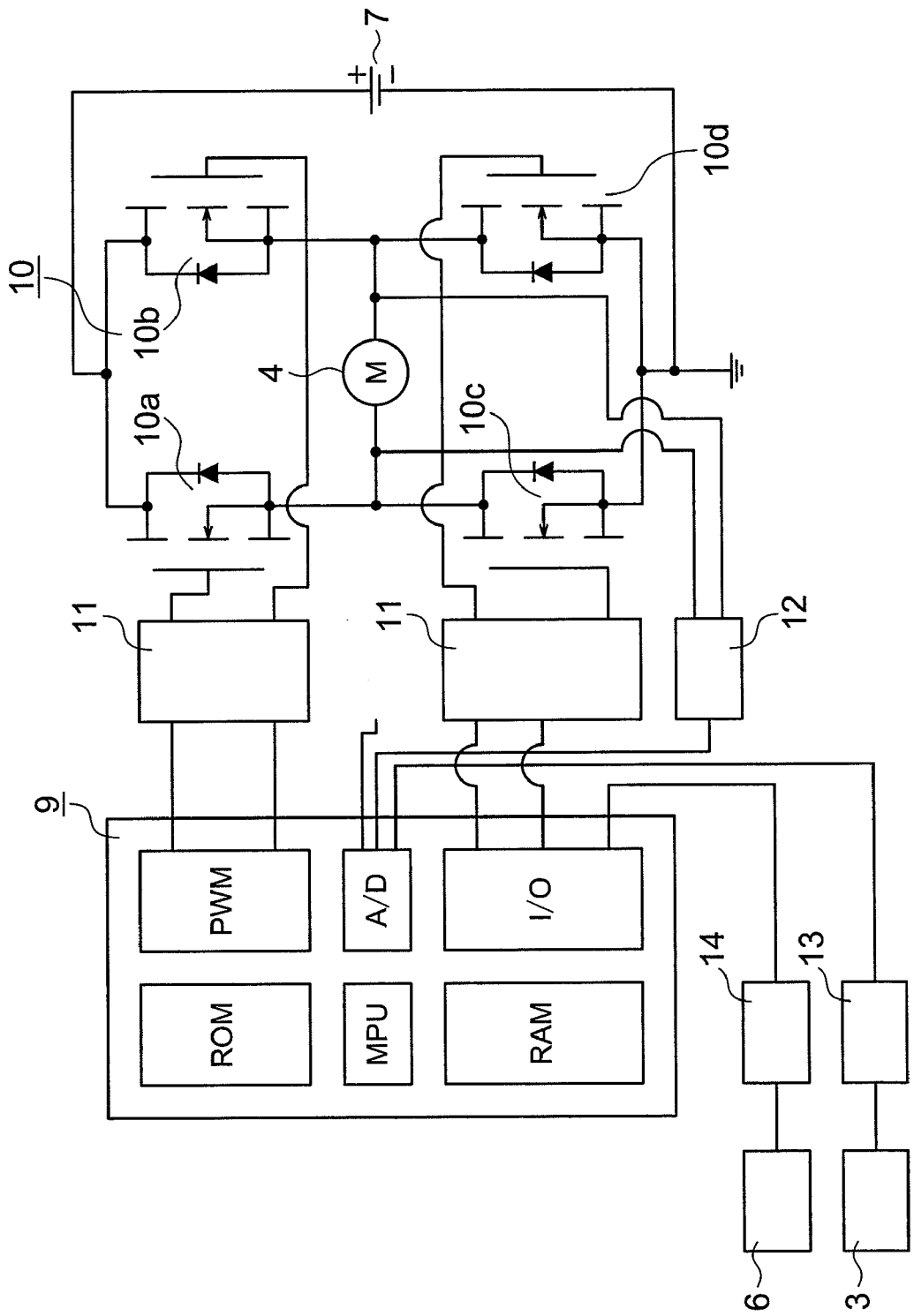
FIG. 2 is a diagram showing the configuration of the electric power steering device according to the first embodiment of the present invention.

FIG. 2 is a diagram showing the details of the controller 8. Reference numeral 9 denotes a microcomputer having a microprocessor MPU, a storage device (ROM and RAM), an input/output port I/O, an analog/digital converter A/D, and a pulse width modulation signal (PWM signal) output circuit PWM. Reference numeral 10 denotes a bridge circuit including four power MOSFETs (10a, 10b, 10c, and 10d, hereinafter referred to as "FET"), reference numeral 11 denotes a gate drive circuit for driving the bridge circuit 10, reference numeral 12 denotes motor impression voltage detecting means for detecting the impression voltage of the motor, reference numeral 13 denotes a torque sensor signal input circuit that processes the output signal of the torque sensor 3, and reference numeral 14 denotes a vehicle speed sensor signal input circuit that processes the output signal of the vehicle speed sensor 6.

Figure 3:
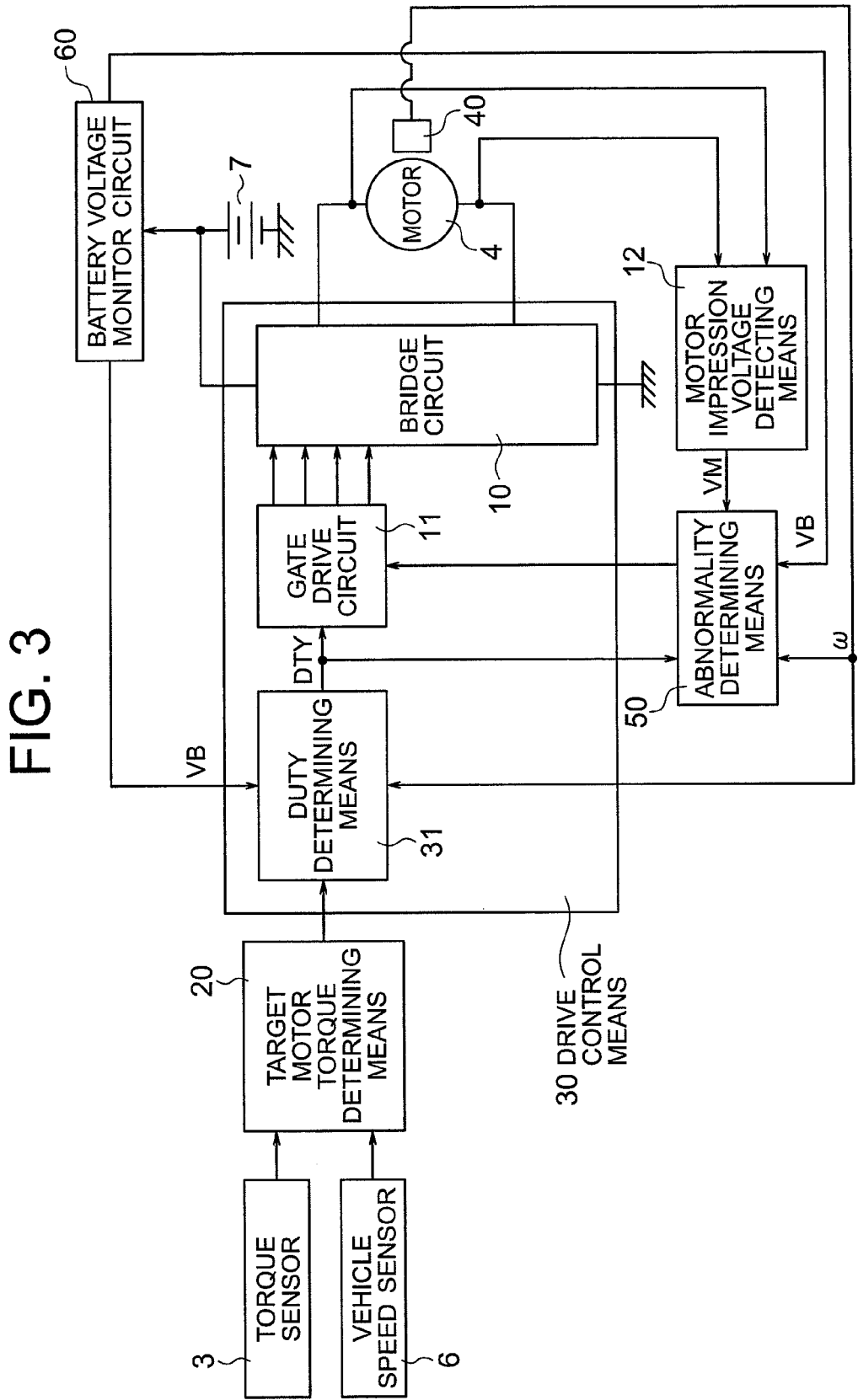
FIG. 3 is a functional block diagram showing the function of a controller in the electric power steering device according to the first embodiment of the present invention.

FIG. 3 is a diagram showing the detailed functional blocks of the controller 8. A description is given of the operation of the electric power steering device according to the present invention with reference to the functional block diagram.

First, the steering force of the driver which has been detected by the torque sensor 3 and the vehicle speed that has been detected by the vehicle speed sensor 6 are input to target motor torque determining means 20, and the target motor torque determining means 20 determines a target motor torque to be output by the motor 4 according to a predetermined characteristic (assist map) corresponding to the detected steering force and vehicle speed.

Then, the determined target motor torque is input to duty determining means 31 of drive control means 30. A voltage VB of the battery 7 which has been detected by a battery voltage monitor circuit 60 and a motor angular velocity ω that has been detected by motor angular velocity detecting means 40 are input to the duty determining means 31 in addition to the target motor torque. The duty determining means 31 determines a voltage to be impressed to the motor 4 (that is, an output voltage of the drive control means 30) VM* based on the input target motor torque and an induced voltage Ve that has been obtained according to the input motor angular velocity ω, and determines a duty DTY based on the output voltage VM* and the battery voltage VB. Also, the duty determining means 31 outputs the determined duty DTY to the gate drive circuit 11, and drives FETs 10a to 10d that constitute the bridge circuit 10 in PWM. As a result, a target torque is generated in the motor 4, and assists the steering of the driver.

The controller 8 is equipped with motor impression voltage detecting means 12. The motor impression voltage detecting means 12 is equipped with a motor terminal voltage detector circuit (not shown) which allows a motor terminal voltage that repeats high and low in synchronism with the on/off operation of a PWM signal to pass through a low-pass filter having a pass characteristic which is equal or lower than a carrier frequency of the PWM signal to obtain an average voltage resulting from removing the carrier wave of the PWM from motor terminal voltages V1 and V2 as motor terminal voltage signals V1_mnit and V2_mnit. The motor impression voltage detecting means 12 calculates a motor impression voltage VM from the motor terminal voltage signals V1_mnit and V2_mnit as follows.

$$VM = V1 - V2 \quad (1)$$
$$= V1\_mnit - V2\_mnit$$

where V1_mnit and V2_mnit are motor terminal voltage signals (V).

The motor impression voltage VM that has been detected by the motor impression voltage detecting means 12 is input to the abnormality determining means 50. The duty DTY that has been determined by the duty determining means 31, the battery voltage VB that has been detected by the battery voltage monitor circuit 60, and the motor angular velocity ω that has been detected by the motor angular velocity detecting means 40 are input to the abnormality determining means 50 in addition to the motor impression voltage VM.

Subsequently, the operation of the abnormality determining means 50 is described. The abnormality determining means 50 determines a failure of the motor 4 and the bridge circuit 10 such as an earth fault, and the operation of the abnormality determining means 50 is different according to the drive system of the bridge circuit 10. Therefore, the operation of the abnormality determining means 50 in the respective drive systems is described. More specifically, there are recited (A) a drive system in which one of a pair of FETs in a target conduction direction is driven by the PWM signal, and another pair of FETs are turned off, (B) a drive system in which one of a pair of FETs in a target conduction direction is driven by the PWM signal, another one of the pair of FETs is continuously turned on, and another pair of FETs are turned off, and (C) a drive system in which a pair of FETs in a target conduction direction is driven by the PWM signal, and another pair of FETs are driven in PWM by a signal complementary to the PWM signal.

Figure 4A:
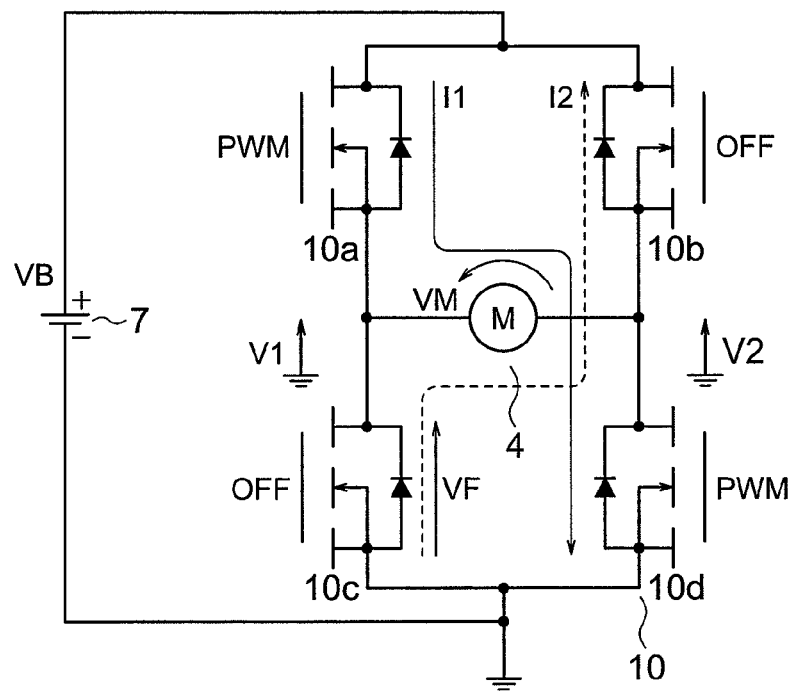
FIGS. 4A and 4B are diagrams for explaining a principle of calculating the output voltage of drive control means in the electric power steering device according to the first embodiment of the present invention.

Hereinafter, a description is given of a case in which the drive system of the above item (A) is applied. FIG. 4A shows a driving method of the respective FETs 10a to 10b, and a path of the motor current when a back electromotive force Ve of the motor 4 satisfies Ve=0. In the drive system of FIG. 4A, when a current flows in the motor 4 in a direction indicated by a symbol I1, the FETs 10a and 10d are driven in PWM at the duty ratio corresponding to a target motor current value to turn off the FETs 10b and 10c. The motor current flows in the path of 11 during the on-states of the FETs 10a and 10d, and the motor current is regenerated in the battery 7 in a path of 12 during the off-states of the FETs 10a and 10d.

Figure 4B:
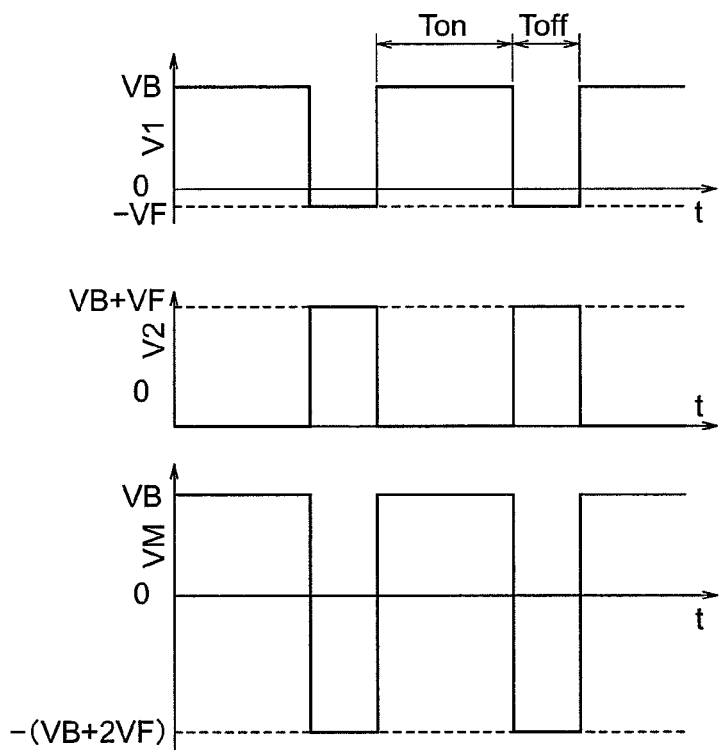

FIG. 4B shows the waveforms of a first terminal voltage V1 and a second terminal voltage V2 of the motor 4 when the voltage drop of the FETs 10a to 10d is ignored at the time of the back electromotive force Ve=0. Under the above conditions, a mean value obtained from removing the PWM carrier wave component from the motor drive voltage, that is, the output voltage VM* of the drive control means 30 is represented from the waveforms of FIG. 4B as follows.

$$VM^* = V1 - V2 \quad (2)$$
$$= \{VB \cdot Ton - (VB + 2 \cdot VF) \cdot Toff\} / (Ton + Toff)$$

where VB is a battery voltage (V), Ton is an on-time of the PWM signal (s), Toff is an off-time of the PWM signal (s), and VF is a parasitic diode forward voltage of the FETs 10a to 10d (V).

Further, the following expression is satisfied.

$$DTY = Ton/(Ton + Toff) \quad (3)$$

When DTY is a PWM duty factor, the expression can be rearranged as follows.

$$VM^* = VB \cdot DTY - (VB + 2 \cdot VF) \cdot (1 - DTY) \quad (4)$$

The above calculation is satisfied only when the right-hand side of the above Expression (4) is positive. When the right-hand side of the above Expression (4) is negative, a so-called current intermittent mode is effective, and the output voltage VM* must be exactly obtained by another arithmetic expression. In that case, it is assumed that the motor impression voltage VM is sufficiently small, and does not reach an overcurrent breakdown even in the earth fault, and the failure determination is prohibited.

In this case, the conditions of the failure determination are obtained from the right-hand side of the above Expression (4) as follows.

$$VB \cdot DTY - (VB + 2 \cdot VF) \cdot (1-DTY) > 0 \therefore DTY > 1/2 + VF/2 \quad (VB+VF) \quad (5)$$

Further, VB>>VF, and the second term of the right-hand side of the above Expression (5) VF/2(VB+VF)≈0. Hence, the Expression (5) approximates the following expression.

$$DTY > 1/2 \quad (6)$$

Hence, when the motor 4 does not rotate, and the PWM duty factor is equal to or higher than 50%, the output voltage VM* can be obtained by the above Expression (4).

In this example, the battery voltage VB is input from the battery voltage monitor circuit 60, the PWM duty factor DTY is a value determined by the duty determining means 31, and the diode forward voltage VF is a constant. From the above viewpoint, the abnormality determining means 50 can calculate the output voltage VM* of the drive control means 30 by the aid of the above Expression (4).

Accordingly, in the abnormality determining means 50, the motor 4 does not rotate by the output of the motor angular velocity detecting means 40, and the back electromotive force can be ignored. Also, when it is determined that the PWM duty factor is equal to or higher than 50%, the motor impression voltage VM which is obtained by the above Expression (1) is compared with the output voltage VM* of the drive control means 30 which is obtained by the above Expression (4), thereby making it possible to determine the abnormality of the bridge circuit 10 such as an earth fault. Accordingly, the abnormality determining means 50 prohibits the abnormality determination when the PWM duty factor is lower than 50%.

Figure 5A:
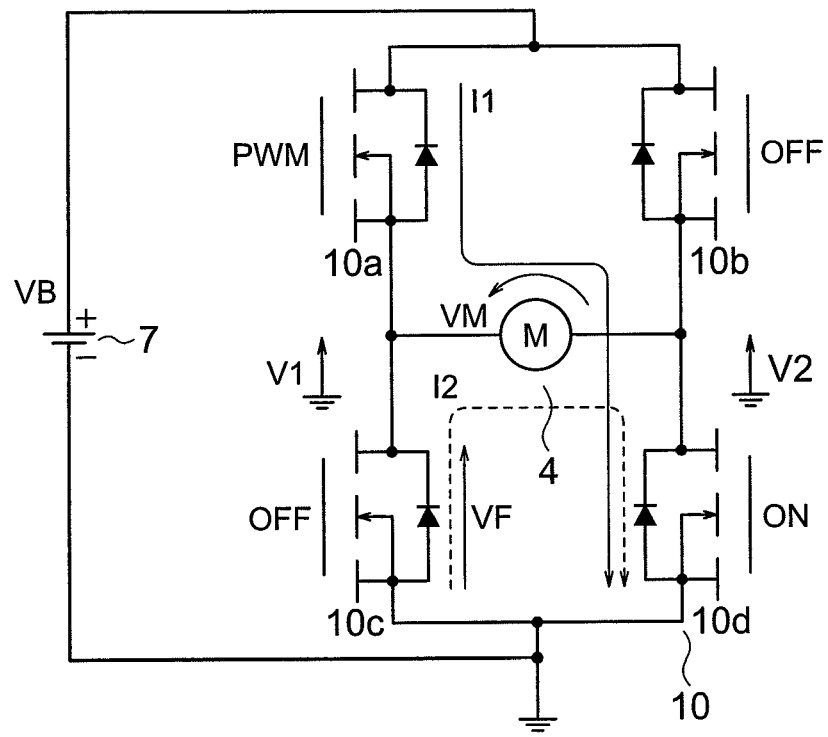
FIGS. 5A and 5B are diagrams for explaining the principle of calculating the output voltage of the drive control means in the electric power steering device according to the first embodiment of the present invention.
Figure 5B:
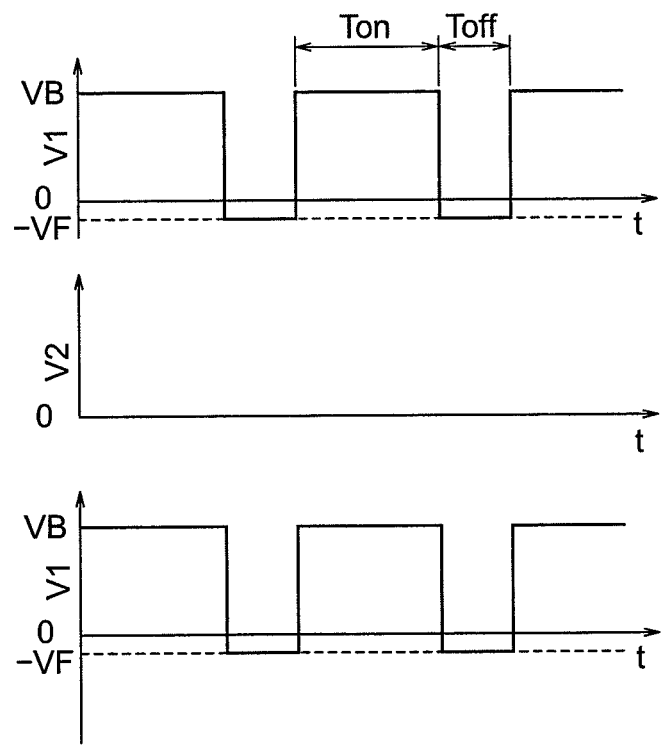

Subsequently, a description is given of a case in which the drive system of the above item (B) is applied. FIGS. 5A and 5B show the current and voltage waveforms of the motor 4 when the voltage drop of the FETs 10a to 10d is ignored, and Ve=0 as in FIGS. 4A and 4B. As in FIGS. 4A and 4B, an average voltage obtained from removing the PWM carrier wave component from the motor drive voltage, that is, the output voltage VM* of the drive control means 30 is obtained from the waveforms of FIG. 5B as follows.

$$VM^* = VB \cdot DTY - VF \cdot (1-DTY) \quad (7)$$

Then, as described in FIGS. 4A and 4B, the motor impression voltage VM which is detected by the motor impression voltage detecting means 12 is compared with the output voltage VM* of the drive control means 30 which is obtained by the above Expression (7), thereby making it possible to determine the abnormality of the bridge circuit 10.

Also, the failure determination conditions can be obtained under the condition where the right-hand side of the above Expression (7) is positive as in the description of FIGS. 4A and 4B.

$$VB \cdot DTY - VF \cdot (1-DTY) > 0 \therefore DTY > VF/(VB+VF) \quad (8)$$

Accordingly, when VB>>VF is satisfied, the failure determination can be conducted when DTY>0.

Figure 6A:
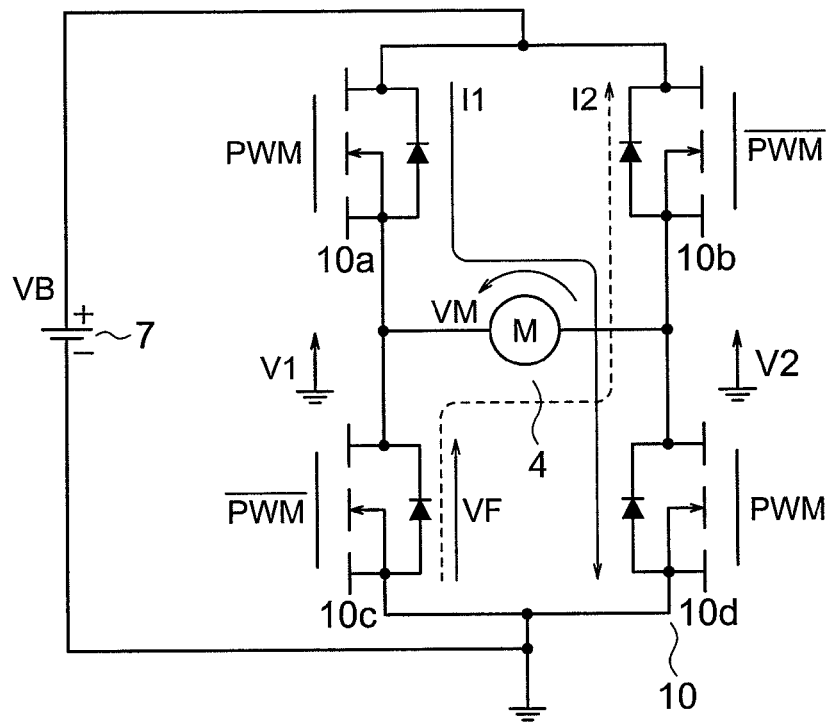
FIGS. 6A and 6B are diagrams for explaining the principle of calculating the output voltage of the drive control means in the electric power steering device according to the first embodiment of the present invention.
Figure 6B:
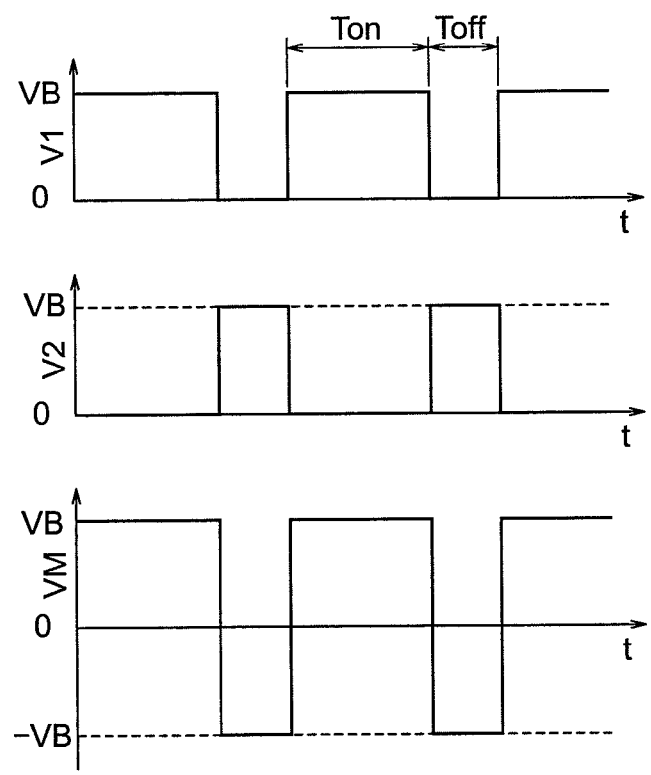

Finally, a description is given of a case in which the drive system of the above item (C) is applied with reference to FIGS. 6A and 6B. FIGS. 6A and 6B show the current and voltage waveforms of the motor 4 when the voltage drop of the FETs 10a to 10d is ignored, and Ve=0 as in FIGS. 4A and 4B. As in FIGS. 4A and 4B, an average voltage obtained from removing the PWM carrier wave component from the motor drive voltage, that is, the output voltage VM* of the drive control means 30 is obtained as follows.

$$VM = VB \cdot DTY - VB \cdot (1-DTY) \quad (9)$$

Then, as described in FIGS. 4A and 4B, the motor impression voltage VM which is detected by the motor impression voltage detecting means 12 is compared with the output voltage VM* of the drive control means 30 which is obtained by the above Expression (7), thereby making it possible to determine the abnormality of the bridge circuit 10.

This example is the drive system in which VM*=0 is satisfied when DTY=50%, both of positive and negative voltages can be impressed to the motor 4, and therefore there are not prohibition conditions of the failure determination. That is, when it can be estimated that the back electromotive force Ve is 0, the failure determination can be always conducted.

Incidentally, the above description is applied to a case of the induced voltage Ve=0. The facts that the induced voltage Ve is developed when the motor 4 rotates, and that the larger induced voltage Ve the larger motor angular velocity ω have been well known. In the case where the motor 4 rotates at high speed in the same direction by an external force when the drive control means 30 drives the FET of the bridge circuit 10 so as to rotate the motor 4 in a target direction, the motor angular velocity ω becomes very high, and the induced voltage Ve also becomes large. For that reason, it should be assumed that the detected motor terminal voltage exceeds the battery voltage VB due to an influence of the induced voltage Ve even when the FET is driven with DTY=100%. In such a state, even when the device is normal, the detected motor impression voltage VM and the output voltage VM* of the drive control means 30 do not coincide with each other. Also, in the above state, that is, in a state where the motor angular velocity ω is larger than a given value, the abnormality determination is prohibited, thereby enabling the misjudgment to be prevented. Also, even if the abnormality determination is not prohibited, a threshold value ε of the abnormality determination changes so as to be larger as the motor angular velocity ω is larger, thereby making it possible to prevent the misjudgment while the abnormality determination is continued.

Likewise, the detected motor impression voltage is not 0V due to an influence of the induced voltage Ve even if DTY=0% (DTY=50% in the case of the drive system of the above item (C)) is satisfied. In the above state, even if the device is normal, the detected motor impression voltage VM and the output voltage VM* of the drive control means 30 do not coincide with each other. In the above state, the abnormality determination is prohibited in a state where the motor angular velocity ω is larger than the given value, or the threshold value ε of the abnormality determination changes so as to be larger as the motor angular velocity ω is larger, thereby making it possible to prevent the misjudgment while the abnormality determination is continued.

As has been described above, the detected motor impression voltage and the output voltage of the drive control means 30 are compared with each other, thereby enabling the abnormality to be determined. Also, the output voltage of the drive control means 30 is obtained in the above manner, and as is apparent from the above expressions, the output voltage is obtained regardless of the motor current Ia. Since the output voltage is irrelevant to the motor current Ia, it is unnecessary to conduct the current detection by the aid of the shunt resistor for abnormality determination.

Further, because it is unnecessary to conduct the current detection using the shunt resistor for abnormality determination, it is possible to remove the shunt resistor and the peripheral circuits or the like. With the removal of those components, the controller can be simplified, and a space in which the shunt resistor and the peripheral circuits are mounted on the circuit board is not required. Also, it is unnecessary to upsize a heat sink in order to radiate the heat that is generated by the shunt resistor, thereby enabling the downsized device and a reduction in the costs. Further, because there is no power loss caused by the shunt resistor, the higher efficiency of the device can be realized.

What is claimed is:

1. An electric power steering device, comprising:
a motor coupled with a steering system;
drive controller for controlling a drive of the motor;
motor impression voltage detector for detecting an applied voltage of the motor; and
abnormality determining part for determining abnormality based on a comparison result of the detected motor impression voltage and an output voltage of the drive controller,
wherein the drive controller drives the motor in PWM, and
wherein the motor impression voltage detector detects an average motor impression voltage.

2. The electric power steering device according to claim 1, wherein the output voltage is calculated based on a duty of a PWM signal and a supply voltage.

3. The electric power steering device according to claim 1, further comprising motor angular velocity detector for detecting an angular velocity of the motor,
wherein the abnormality determining part prohibits the abnormality determination when the motor angular velocity which is output from the motor angular velocity detector is equal to or higher than a given value.

4. The electric power steering device according to claim 1, further comprising motor angular velocity detector for detecting an angular velocity of the motor,
wherein the abnormality determining part changes a threshold value for the abnormality determination according to a magnitude of the motor angular velocity which is output from the motor angular velocity detector.

5. The electric power steering device according to claim 1, wherein a motor current detector is not used in the determining of whether an abnormality exists.

6. An electric power steering device, comprising:
a motor coupled with a steering system;
drive controller for controlling a drive of the motor;
motor impression voltage detector for detecting an applied voltage of the motor; and
abnormality determining part for determining abnormality based on a comparison result of the detected motor impression voltage and an output voltage of the drive controller,
wherein the drive controller drives the motor in PWM, and the output voltage is calculated based on a duty of a PWM signal and a supply voltage, and
wherein the motor impression voltage detector has a low-pass filter having a pass characteristic that is equal or lower than a carrier frequency of the PWM signal.

7. An electric power steering device, comprising:
a motor coupled with a steering system;
drive controller for controlling a drive of the motor;
motor impression voltage detector for detecting an applied voltage of the motor; and
abnormality determining part for determining abnormality based on a comparison result of the detected motor impression voltage and an output voltage of the drive controller,
wherein the drive controller drives the motor in PWM, and the output voltage is calculated based on a duty of a PWM signal and a supply voltage, and
wherein the abnormality determining part prohibits the abnormality determination when the duty of the PWM signal is lower than a given value.

8. An electric power steering device, comprising:
a motor coupled with a steering system;
drive controller for controlling a drive of the motor;
motor impression voltage detector for detecting an applied voltage of the motor;
abnormality determining part for determining abnormality based on a comparison result of the detected motor impression voltage and an output voltage of the drive controller; and
a current path which supplies electrical current to the motor in a current flow direction,
wherein the motor impression voltage detector is connected to an upstream portion of the current path which is located upstream from the motor in the current flow direction and to a downstream portion of the current path which is located downstream from the motor in the current flow direction, and
wherein the motor impression voltage detector detects a voltage difference between the upstream portion and the downstream portion of the current path.

* * * * *